United States Patent [19]

Nakajima

[11] Patent Number: 5,541,726
[45] Date of Patent: Jul. 30, 1996

[54] RELATIVE AZIMUTH MEASURING METHOD AND APPARATUS

[75] Inventor: Shin-ichi Nakajima, Tokyo, Japan

[73] Assignee: NEC Corporation, Tokyo, Japan

[21] Appl. No.: 229,704

[22] Filed: Apr. 19, 1994

[30] Foreign Application Priority Data

Apr. 19, 1993 [JP] Japan ..................................... 5-090347

[51] Int. Cl.$^6$ .............................. G01B 11/26; G01C 1/00
[52] U.S. Cl. ........................................................ 356/141.1
[58] Field of Search ............................ 356/141.1, 152.2,
356/152.3; 359/527, 529, 530, 546, 547,
548, 541

[56] References Cited

U.S. PATENT DOCUMENTS

| | | | |
|---|---|---|---|
| 1,918,087 | 7/1932 | Donley | 359/547 |
| 3,861,807 | 1/1975 | Lescrenier | 356/152.2 |
| 3,910,533 | 10/1975 | Cheatham et al. | 244/216 |
| 4,834,531 | 5/1989 | Ward | 356/5.08 |
| 5,068,522 | 11/1991 | Falp et al. | 250/206.1 |
| 5,166,746 | 11/1992 | Sato et al. | 356/141.2 |
| 5,334,848 | 8/1994 | Grimm | 250/548 |
| 5,340,060 | 8/1994 | Shindo | 244/161 |

FOREIGN PATENT DOCUMENTS

WO91/09325  6/1991  WIPO ............................. G01S 17/42

*Primary Examiner*—Thomas H. Tarcza
*Assistant Examiner*—Pinchus M. Laufer
*Attorney, Agent, or Firm*—Leydig, Voit & Mayer

[57] ABSTRACT

A measuring section of a target tracer emits emergent light from a light source toward a reflector of a target by way of a half mirror of an optical system. The reflector has a light reflection factor increasing toward the center thereof and has areas of respective reflection factors arranged concentrically. Reflected light from the reflector passes through the mirror and is introduced to an imaging element. The imaging element scans a two-dimensional image of the reflector to generate electric signals composed of a plurality of corresponding picture elements. A threshold value comparing circuit selects those of the electric signals which are higher than a threshold value as azimuth signals. An angle calculating circuit calculates the center of the image of the reflector from the azimuth signals and calculates an azimuth angle and an elevation angle of the target with respect to the measuring section from a displacement of the center of the image from the center of a field of view of the imaging element. A threshold value controlling circuit increases the threshold value when the number of picture element of the azimuth signals is greater than a predetermined value, but decreases the threshold value when the number of picture elements of the azimuth signals is smaller than the predetermined value.

10 Claims, 6 Drawing Sheets

RELATIVE AZIMUTH MEASURING METHOD AND APPARATUS

BACKGROUND OF THE INVENTION

1. Field of the Invention

This invention relates to a relative azimuth measuring method and apparatus for measuring an azimuth angle and an elevation angle, that is, a relative azimuth, of a target with respect to a target tracer using an optical signal, and more particularly to a relative azimuth measuring method and apparatus which can measure a relative azimuth to a target at a short distance with a high degree of accuracy.

2. Description of the Related Art

Conventionally, one of relative azimuth measuring apparatus of the type mentioned is known as a rendezvous laser radar which is used for orientation of the azimuth of a target spacecraft which is a target in rendezvous docking of artificial satellites. The relative azimuth measuring apparatus measures the azimuth angle and the elevation angle of the target spacecraft with respect to a chaser spacecraft as a target tracer, or in other words, the relative azimuth between moving bodies or the relative azimuth of a moving body as viewed from a fixed point.

In the following, a relative azimuth measuring apparatus which employs conventional techniques is described with reference to a block diagram of the conventional relative azimuth measuring apparatus shown in FIG. 1 and a front elevational view of reflector 102 which is shown in FIG. 2 and employed in the relative azimuth measuring apparatus of FIG. 1.

The present relative azimuth measuring apparatus includes measuring section 101 installed fixedly on a chaser spacecraft or a like chaser, and reflector 102 installed fixedly on target 1 such as a target spacecraft. Measuring section 101 measures the relative azimuth of target 1 to measuring section 101. Here, reflector 102 is an aggregate of a plurality of small reflectors 1021 formed from corner cubes or like elements and reflects light to its incident direction. All small reflectors 1021 have an equal reflection factor and size and a same profile.

Light source 5 in measuring section 101 is a laser light oscillator or a like element which generates light of the wavelength of 830 nm, and generates emergent light H1 of the known wavelength. This emergent light H1 is emitted toward reflector 102 by way of half mirror 4 which makes a part of optical system 3. Reflector 102 receives emergent light H1 and reflects it toward the direction of half mirror 4. Reflected light H2 from reflector 102 is introduced again to and passes through half mirror 4 so that it is introduced to two-dimensional imaging element 6 for which a CCD or a like element is employed.

Imaging element 6 forms an image of reflected light H2 as a two-dimensional reflector image, photo-electrically converts the reflector image into electric signals S1 of corresponding two-dimensional image information and supplies electric signals S1 to angle calculating circuit 108. It is to be noted that the reflector image indicates an outer profile of reflector 102. Angle calculating circuit 108 calculates the center of the reflector image from electric signals S1 and calculates the displacement between the center of the reflector image on the imaging plane and the center of the field of view of imaging element 6, and then calculates the azimuth angle and the elevation angle, that is, the relative azimuth, of target 1, on which reflector 102 is installed fixedly, with respect to measuring section 101.

However, the conventional relative azimuth measuring apparatus is disadvantageous in that, since the size of the reflector is fixed, when the target and the measuring section approach each other to decrease the distance between them, the reflector image increases in size so that it protrudes from the field of view of the imaging element, resulting in difficulty to accurately find out the center of the reflector image and in degradation of the accuracy in measurement of the relative azimuth of the target with respect to the measuring section.

The relative azimuth measuring apparatus is also disadvantageous in that it cannot measure the relative azimuth any more when the entire field of view of the imaging element is covered with the reflector image.

SUMMARY OF THE INVENTION

In view of the disadvantages of the conventional relative azimuth measuring apparatus described above, it is an object of the present invention to provide a relative azimuth measuring method and apparatus which can measure the relative azimuth with a high degree of accuracy even if the position of a target approaches the position of a target tracer until a reflector image protrudes from the field of view of an imaging apparatus.

In order to attain the object described above, according to a relative azimuth measuring method of the present invention, an azimuth angle and an elevation angle of a target with respect to a target tracer is measured using a light beam, wherein first, toward reflector means which is installed fixedly on a target and reflects incident light as reflected light in a direction opposite to an incidence direction of the incident light, light is introduced from measuring means installed fixedly on a target tracer, the reflector means having areas of respective light reflection factors which form a concentrical regular polygonal multiple reflection area or a concentrical circular multiple reflection area where light reflection factors increase toward the center of the reflector means; and on the target tracer, the measuring means inputs the reflected light reflected from the reflector means, produces a two-dimensional image of the reflector means from the reflected light, then converts the two-dimensional image by photo-electric conversion to obtain electric signals corresponding to a plurality of picture elements of the two-dimensional image, adopts only those of the electric signals which are higher in magnitude than a particular threshold value as azimuth signals and calculates the relative azimuth using the azimuth signals.

A relative azimuth measuring apparatus of the present invention comprises:

reflector means installed fixedly on a target for reflecting incident light as reflected light in a direction opposite to an incident direction of the incident light, the reflector means having areas of respective light reflection factors which form a concentrical regular polygonal multiple reflection area or a concentrical circular multiple reflection area where light reflection factors increase toward the center of the reflector means; and measuring means installed fixedly on a target tracer and including an optical system for emitting emergent light toward the direction of the reflector means and receiving reflected light of the emergent light reflected from the reflector means, an imaging element for forming a two-dimensional image of the reflector means from the reflected light inputted thereto from the optical system and converting the two-dimensional image by photo-electric conversion to produce a plurality of electric signals corresponding to a plurality of picture elements, and a relative azimuth calculating section for calculating a relative azimuth between the target and the target tracer in response to those of the electric signals which are higher in magnitude than a particular threshold value;

the relative azimuth calculating section including a threshold value comparing circuit for outputting those of the electric signals inputted thereto from the imaging element which are higher in magnitude than the threshold value as azimuth signals, a threshold value controlling circuit for calculating the number of picture elements of the azimuth signals for one frame of the two-dimensional image and increasing the threshold value when the counted picture number is greater than a predetermined value but decreasing the threshold value when the counted picture number is smaller than the predetermined value, and an angle calculating circuit for calculating a displacement of the center of the two-dimensional image constituted from the azimuth signals from the center of a field of view of a screen of the imaging element and calculating the relative azimuth from a value of the displacement and a horizontal angle and a vertical angle of the field of view of the screen of the measuring means.

DETAILED DESCRIPTION OF THE PREFERRED EMBODIMENT

Figure 1:
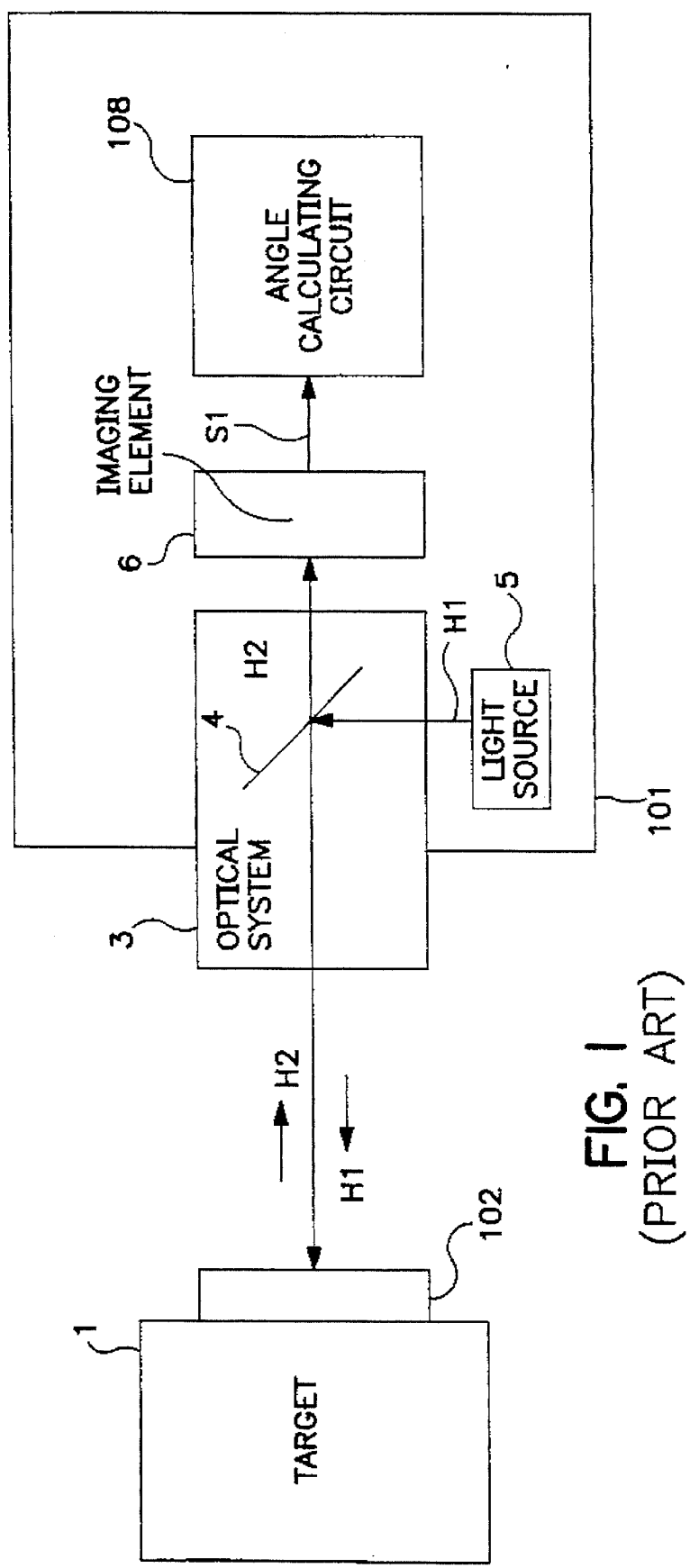
FIG. 1 is a block diagram showing the construction of a conventional example of a relative azimuth measuring apparatus.
Figure 2:
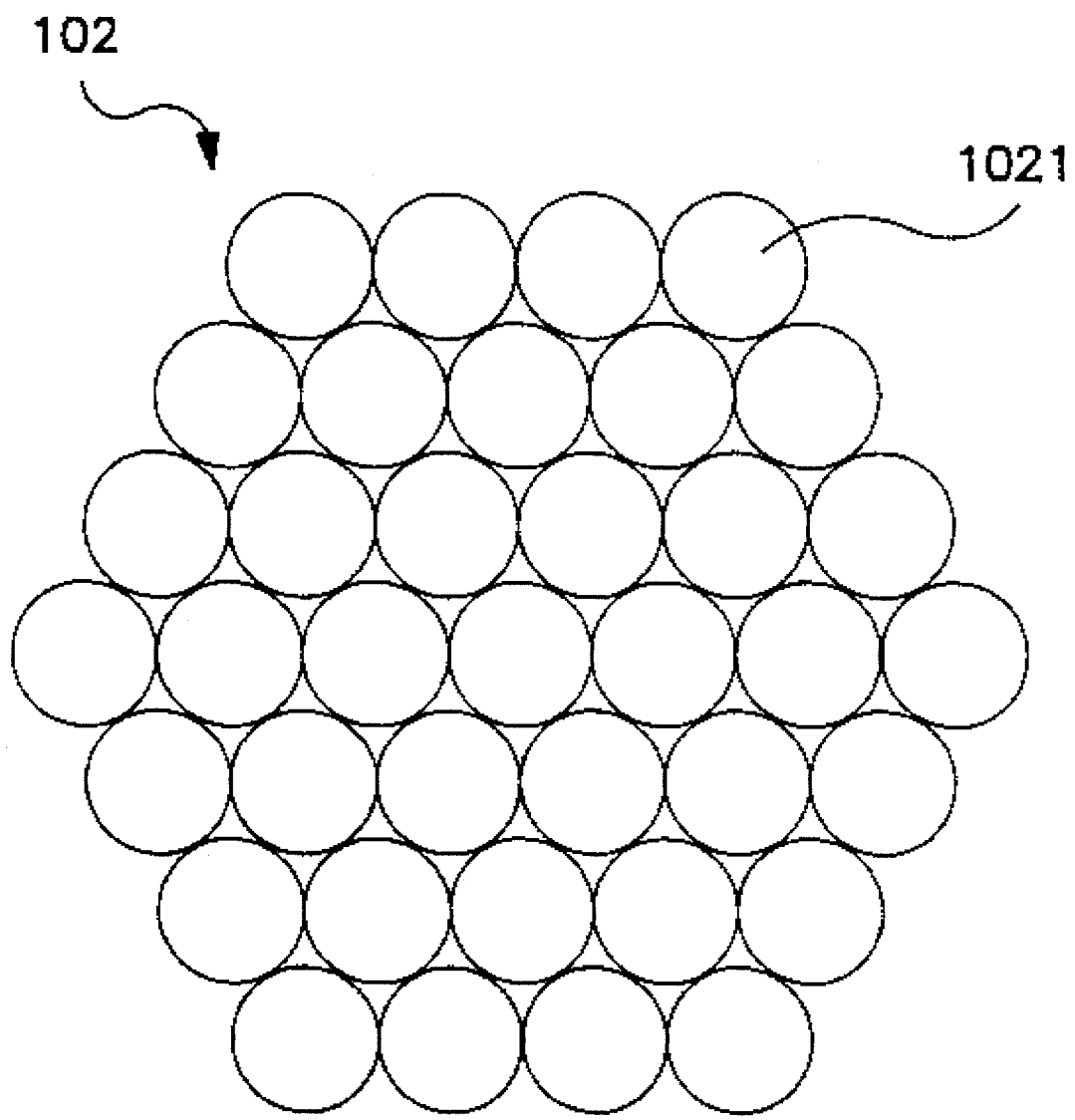
FIG. 2 is a front elevational view of reflector 102 employed in the relative azimuth measuring apparatus of FIG. 1.
Figure 3:
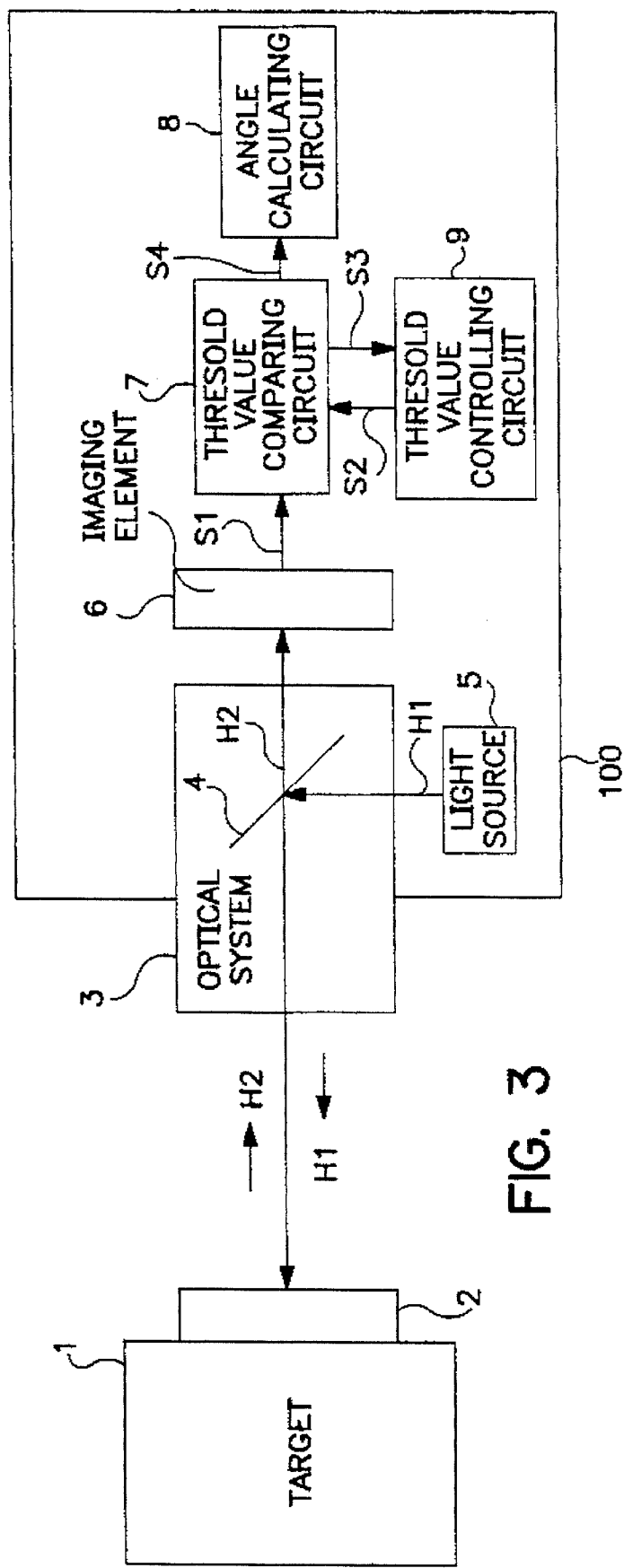
FIG. 3 is a block diagram showing the construction of an embodiment of a relative azimuth measuring apparatus of the present invention.

A relative azimuth measuring apparatus which employs an embodiment of a relative azimuth measuring method of the present invention is described with reference to FIG. 3.

Figure 4A:
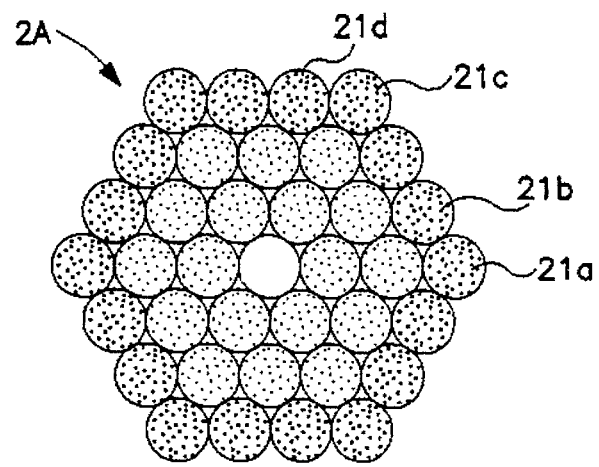
FIGS. 4A, 4B and 4C are front elevational views showing different reflectors 2A, 2B and 2C suitable for use with the present embodiment.

The present relative azimuth measuring apparatus includes measuring section 100 installed fixedly on a spacecraft serving as a tracer of target 1, and reflector 2 installed fixedly on target 1 serving as the other spacecraft. As reflector 2, reflector 2A of FIG. 4A is used.

Reflector 2A is an aggregate of small reflectors 21a, 21b, 21c and 21d each in the form of a corner cube which reflects light in a direction opposite to the incident direction of the light. Small reflectors 21a to 21d form a hexagonal closest packing structure wherein they are individually arranged on regular hexagonal concentrical areas. In particular, reflector 2A includes small reflector 21a disposed at the innermost side (center), six small reflectors 21b disposed on the outer side of small reflector 21a, twelve small reflectors 21c disposed on the outer side of small reflectors 21b, and eighteen small reflectors 21d disposed on the outermost side. In short, the number of small reflectors located on the nth concentrical layer (n is an integer equal to or greater than 2) as counted from the innermost side is $6\times(n-1)$.

Those small reflectors 21a to 21d have light reflection factors which increase toward the inner side of reflector 2A. In particular, the values of the reflection factors of small reflectors 21a to 21d have the relationship of $21a>21b>21c>21d$. Accordingly, reflector 2A has a higher light reflection factor toward the center thereof and exhibits an equal reflection factor at the same radial distance. It is to be noted that the differences in light reflection factor among small reflectors 21a to 21d may be set by the difference in coating.

Light source 5 of measuring section 100 generates emergent light H1 of a known wavelength from a laser light oscillator which generates laser light of the wavelength of 830 nm or a like element. This emergent light H1 is emitted toward the direction of reflector 2A by way of half mirror 4 which makes a part of optical system 3. Reflector 2A receives this emergent light H1 and reflects it toward the direction of half mirror 4. Reflected light H2 from reflector 2A is introduced again to and passes through half mirror 4 so that it is introduced to two-dimensional imaging element 6 for which a CCD or a like element may be used. Imaging element 6 forms an image of reflected light H2 as a two-dimensional reflector image, converts the reflector image by photo-electric conversion to form electric signals S1 of corresponding two-dimensional image information composed of a plurality of picture elements and supplies electric signals S1 to threshold value comparing circuit 7.

Threshold value comparing circuit 7, threshold value controlling circuit 8 and angle calculating circuit 9 form a relative azimuth calculating section of the relative azimuth measuring apparatus. Threshold value comparing circuit 7 compares threshold value S2 supplied thereto from threshold value controlling circuit 9 and electric signals S1 with each other in magnitude and supplies those electric signals which are higher than threshold value S2 as azimuth signals S4 to angle calculating circuit 8. Angle calculating circuit 8 calculates, for each one frame of the reflector image, the center of the reflector image on an image forming plane corresponding to azimuth signals S4 and further calculates the displacement between the center of the reflector image and the center of the field of view of imaging element 6, and then calculates the azimuth angle and the elevation angle, that is, the relative azimuth, of target 1, on which reflector 2A is installed fixedly, with respect to measuring section 100.

Figure 6:
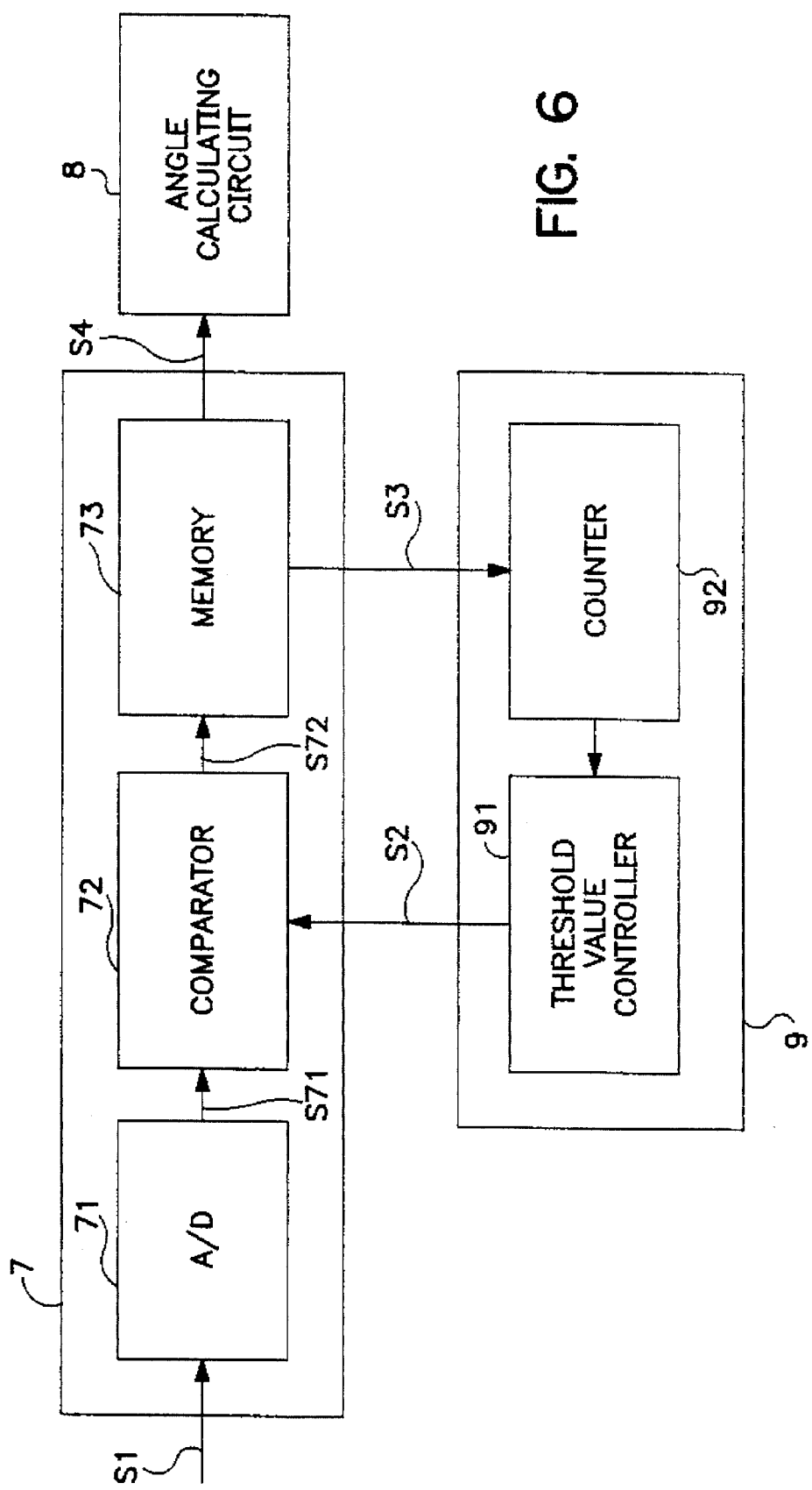
FIG. 6 is a detailed block diagram of a relative azimuth calculating circuit formed from threshold value comparing circuit 7, angle calculating circuit 8 and threshold value controlling circuit 9 of the present embodiment.

Next, the constructions and the functions of threshold value comparing circuit 7, angle calculating circuit 8 and threshold value controlling circuit 9 described above are described with reference to FIG. 6.

Analog/digital converter (A/D) 71 of threshold value comparing circuit 7 converts electric signals S1 from imaging element 6 for individual picture elements into picture element signals S71 each in the form of a digital value. Picture element signals S71 are compared with threshold value S2 from threshold value controller 91 in threshold value controlling circuit 9 by comparator 72, and those signals which are higher than threshold value S2 are stored as azimuth signals S72 into memory 73. Memory 73 stores azimuth signals S72 in sets of a horizontal coordinate and a vertical coordinate of the reflector image. Azimuth signals S72 are read out as azimuth signals S4 by angle calculating circuit 8 and used later as data for calculation of the relative azimuth as hereinafter described with reference to FIG. 5.

On the other hand, counter 92 of threshold value controlling circuit 9 simultaneously counts picture element number S3 of azimuth directions S72 stored in memory 73 of threshold value comparing circuit 7 for each one frame of the reflector image. Threshold value controller 91 operates in response to picture element number S3 from counter 92 to increase threshold value S2 when picture element number S3 is greater than a predetermined value (for example, 3,000) but decrease threshold value S2 when picture element number S3 is smaller than the predetermined value. As described hereinabove, when picture element number S3 is greater, threshold value comparing circuit 7 does not select the entire reflector image of reflector 2A as azimuth signals S4 but selects only the reflector image from which electric signals S1 of the values higher than threshold value S2 are generated as azimuth signals S4. Control of picture element number S3 of azimuth signals S4 can be performed as the light reflection factor of reflector 2A is set so as to increase toward the concentric circle at the center.

As target 1 and measuring section 100 approach each other to decrease the distance between them, the reflector image of reflector 2A formed on imaging element 6 becomes larger so that picture element number S3 of azimuth signals S4 increases. However, since threshold value controlling circuit 9 makes threshold value S2 higher in response to picture element number S3, picture element number S4 is limited to a value lower than the predetermined value. As a result, even if the reflector image formed on imaging element 6 protrudes from the field of view of imaging element 6, the reflector image of azimuth signals S4 supplied to angle calculating circuit 8 does not include the reflector image at the outer portion of reflector 2A as described hereinabove. Accordingly, the center of the reflector image can be calculated as described below.

Figure 5:
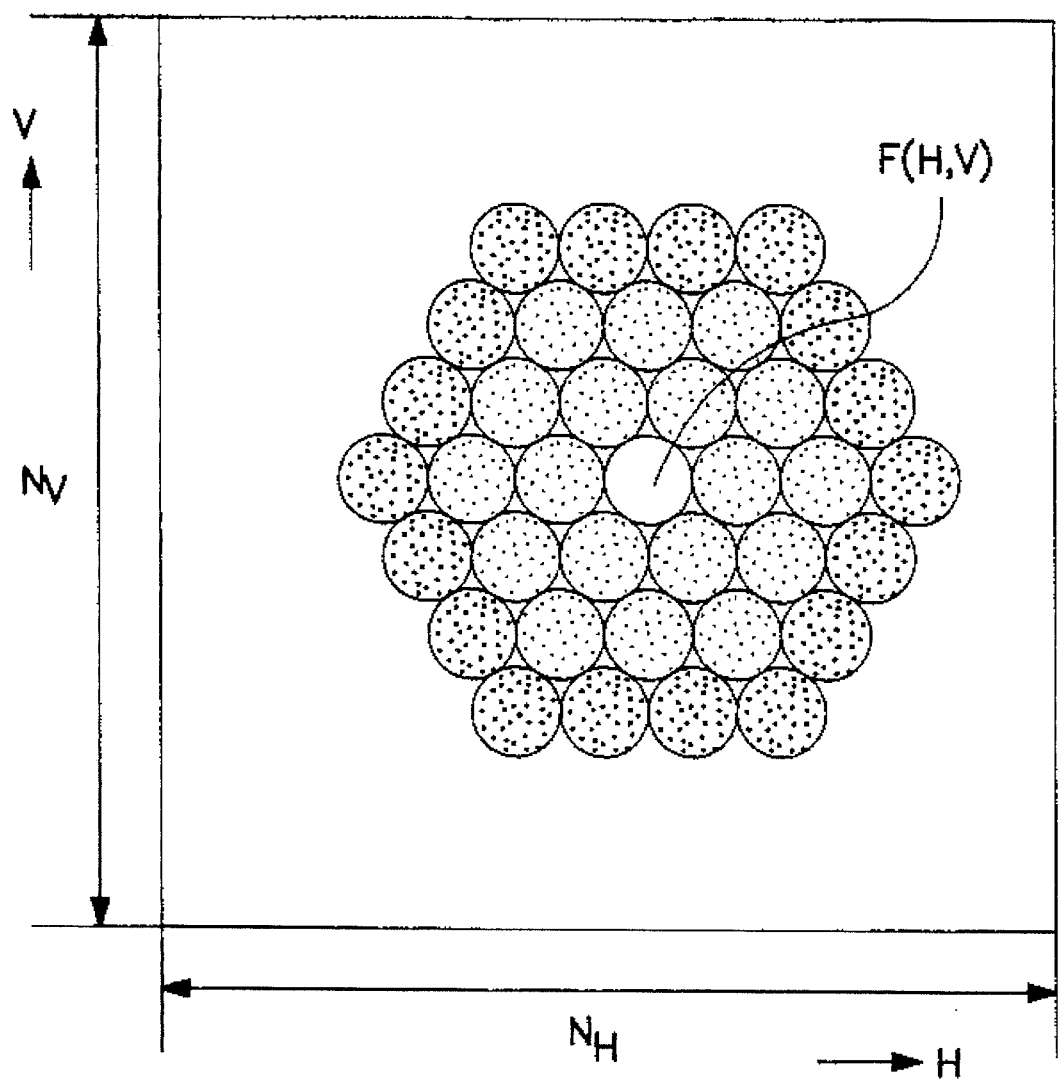
FIG. 5 is a view showing a reflector image of reflector 2A formed by imaging element 6 of the present embodiment.

Next, a calculating operation for the relative azimuth according to the present embodiment is described in detail with reference to FIG. 5.

Imaging element 6 is a two-dimensional CCD sensor μPD3543 (by NEC Corporation) having a picture element number $N_H$ in the horizontal direction of 711 and a picture element number $N_V$ in the vertical direction of 485. Since reflector 2A reflects emergent light H1 in higher intensity at an area thereof nearer to the center, the two-dimensional image (reflector image) of reflector 2A formed by imaging element 6 produces electric signals S1 which are higher toward the center of the image. It is to be noted that, since target 1 except reflector 2A reflects emergent light H1 at random, the threshold, S2, may be set so that in general, the electric signals S1 generated from imaging element 6 are lower than threshold value S2 except the reflector image from reflector 2A.

The coordinate of the center of the reflector image is represented by F(H, V). Horizontal coordinate H and vertical coordinate V of center coordinate F(H, V) are calculated from azimuth signals S4 obtained from threshold value comparing circuit 7 by angle calculating circuit 8 in accordance with following equations (1) and (2), respectively:

$$H = \frac{1}{N} \cdot \sum_{i=1}^{N} Hi \quad (1)$$

$$V = \frac{1}{N} \cdot \sum_{i=1}^{N} Vi \quad (2)$$

where N is the number of picture elements of electric signals S1 higher than threshold value S2, and Hi and Vi are the horizontal coordinate and the vertical coordinate, respectively, of the ith picture element among the N picture elements. If the reflector image coincides with the center of the field of view of imaging element 6, then $H=N_H/2$ and $V=N_V/2$ are satisfied.

Where the horizontal field of view of imaging element 6 with respect to the $N_H \times N_V$ picture elements is represented by $\theta_H$ and the vertical field of view is represented by $\theta_V$, azimuth angle $\theta_{AZ}$ and elevation angle $\theta_{EL}$ of reflector 2A with respect to imaging element 6 are given by following equations (3) and (4), respectively:

$$\theta_{AZ} = \frac{(H - N_H/2) \cdot \theta_H}{N_H} \quad (3)$$

$$\theta_{EL} = \frac{(V - N_V/2) \cdot \theta_V}{N_V} \quad (4)$$

Angle calculation circuit 8 calculates those azimuth angle $\theta_{AZ}$ and elevation angle $\theta_{EL}$ and determines those azimuth angle $\theta_{AZ}$ and elevation angle $\theta_{EL}$ as the relative azimuth of target 1 with respect to measuring section 100.

Figure 4B:
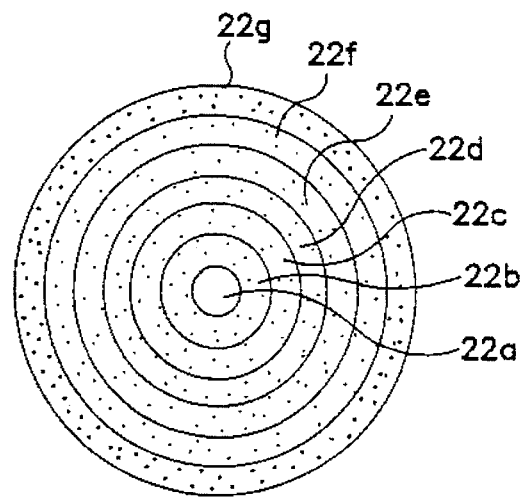

Referring to FIG. 4B, another reflector 2B suitably used with the relative azimuth measuring apparatus described above includes small reflectors 22a, 22b, 22c, 22d, 22e, 22f and 22g disposed in a plurality of rings having different diameters from one another. Those small reflectors 22a to 22g are disposed on concentrical areas having larger diameters in order of 22a<22b<22c<22d<22e<22f<22g and besides have higher light reflection factors toward the center of reflector 2B. Also this reflector 2B acts in a similar manner to reflector 2A.

Figure 4C:
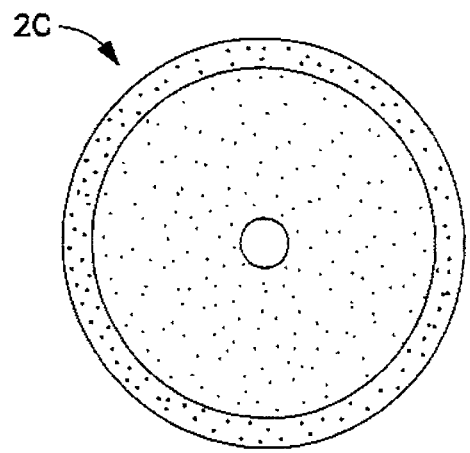

Referring to FIG. 4C, a further reflector 2C suitably used with the relative azimuth measuring apparatus described above is constituted from a single circular light reflecting body. Reflector 2C is processed so that it has a light reflection factor which increases toward the center and areas having equal reflection factors form concentrical annuli. Also this reflector 2C has the same function in regard to the light reflection factor as the two examples described above.

Here, if a microprocessor is used as hardware for comparator 72, angle calculating circuit 8, threshold value controller 91 and counter 92, then since the numerical values of threshold value S2 and picture element number S3 can be varied readily, variation of the accuracy in relative azimuth measurement or some other processing of the relative azimuth measuring apparatus is facilitated.

As described so far, according to the present invention, since the reflector installed on the target is constructed so that the light reflection factor thereof increases toward the center thereof and areas of equal reflection factors make concentrical annuli and, when the image of the reflector formed on the imaging element of the measuring section increases in size, the processing threshold value for relative azimuth calculation is increased automatically, even if the target and the measuring section approach each other to decrease the distance between them, the image of the reflector does not protrude from the field of view of the imaging element. Accordingly, there is an effect in that the circumstance that the accuracy in measurement of the relative azimuth between the target and the measuring section is deteriorated or the measurement becomes impossible because the imager is completely filled by the reflector image can be eliminated.

What is claimed is:

1. A relative azimuth measuring method wherein an azimuth angle and an elevation angle, that is, a relative azimuth, of a target with respect to a target tracer is measured using a light beam, wherein:

first, toward reflector means which is installed fixedly on said target and reflects incident light as reflected light in a direction opposite to an incidence direction of the incident light, light is introduced from measuring means installed fixedly on said target tracer, said reflector means having areas of respective reflection factors which form a concentrical regular polygonal multiple reflection area or a concentrical circular multiple reflection area where light reflector factors increase toward the center of said reflector means; and on the other hand, on said target tracer, said measuring means inputs the reflected light reflected from said reflector means, produces a two-dimensional image of said reflector means from the reflected light, then converts the two-dimensional image by photo-electric conversion to obtain electric signals corresponding to a plurality of picture elements of the two-dimensional image, adopts only those of the electric signals which are higher in magnitude than a particular threshold value as azimuth signals and calculates the relative azimuth using the azimuth signals.

2. A relative azimuth measuring method as claimed in claim 1, wherein the threshold value is increased in magnitude thereof when the number of a plurality of picture elements constituting the two-dimensional image of said reflector means is greater than a predetermined value, but is decreased in magnitude conversely when said number of the plurality of picture elements is smaller than the predetermined value.

3. A relative azimuth measuring method as claimed in claim 2, wherein the predetermined value is determined so that the reflector image of one frame constituted from the azimuth signals may be accommodated in a field of view of an image screen of said measuring means.

4. A relative azimuth measuring method as claimed in claim 1, wherein a displacement of the center of the reflector image constituted from the azimuth signals from the center of a field of view of an image screen of said measuring means, and the relative azimuth is calculated from a value of the displacement and a horizontal angle and a vertical angle of the field of view of the image screen of said measuring means.

5. A relative azimuth measuring apparatus wherein an azimuth angle and an elevation angle, that is, a relative azimuth, of a target with respect to a target tracer is measured using a light beam, comprising:

reflector means installed fixedly on said target for reflecting incident light as reflected light in a direction opposite to an incident direction of the incident light, said reflector means having areas of respective light reflection factors which form a concentrical regular polygonal multiple reflection area or a concentrical circular multiple reflection area where light reflection factors increase toward the center of said reflector means; and measuring means installed fixedly on said target tracer and including an optical system for emitting emergent light toward the direction of said reflector means and receiving reflected light of the emergent light reflected from said reflector means, an imaging element for forming a two-dimensional image of said reflector means from the reflected light inputted thereto from said optical system and converting the two-dimensional image by photo-electric conversion to produce a plurality of electric signals corresponding to a plurality of picture elements, and a relative azimuth calculating section for calculating a relative azimuth between said target and said target tracer in response to those of the electric signals which are higher in magnitude than a particular threshold value;

said relative azimuth calculating section including a threshold value comparing circuit for outputting those of the electric signals inputted thereto from said imaging element which are higher in magnitude than the threshold value as azimuth signals, a threshold value controlling circuit for calculating a number of picture elements of the azimuth signals for one frame of the two-dimensional image and increasing the threshold value when the counted picture number is greater than a predetermined value but decreasing the threshold value when the counted picture number is smaller than the predetermined value, and an angle calculating circuit for calculating a displacement of the center of the two-dimensional image constituted from the azimuth signals from the center of a field of view of a screen of said imaging element and calculating the relative azimuth from a value of the displacement and a horizontal angle and a vertical angle of the field of view of the screen of said measuring means.

6. A relative azimuth measuring apparatus as claimed in claim 5, wherein said reflector means is formed from concentrical multiple reflection areas having a plurality of small reflectors which form a hexagonal closest packing structure in each of said areas.

7. A relative azimuth measuring apparatus as claimed in claim 5, wherein said reflector means is formed from concentrical annular multiple reflection areas having a plurality of small reflectors in each of said areas.

8. A relative azimuth measuring apparatus as claimed in claim 6, wherein said reflector means is constituted from a single circular light reflecting body and has areas of equal reflection factors which are positioned on same concentrical rings and processed so that the reflection factor increases toward the area nearest to the center of said circular light reflecting body.

9. A relative azimuth measuring apparatus as claimed in claim 5, wherein said threshold value comparing circuit includes an analog/digital converter for converting the electric signals each in the form of an electric signal inputted thereto from said imaging element into digital electric signals, a comparator for outputting those of the digital electric signals which are higher than the threshold value as the azimuth signals, and a memory for storing the azimuth signals in sets of a horizontal coordinate and a vertical coordinate of the two-dimensional image for each of the picture elements, and said threshold value controlling circuit includes a counter for counting the number of the picture elements stored in said memory in units of a frame of the two-dimensional image, and a threshold value controller for increasing the threshold value in magnitude when the number of the picture elements of one frame counted by said counter is greater than a predetermined value but decreasing the threshold value in magnitude when the number of the picture elements of one frame is smaller than the predetermined value.

10. A relative azimuth measuring apparatus as claimed in claim 9, wherein the predetermined value is determined so that the two-dimensional image in units of a frame constituted from the azimuth signals may be accommodated in a field of view of an image screen of said imaging element.

* * * * *